United States Patent [19]

Jasinski

[11] 3,804,514

[45] Apr. 16, 1974

[54] DUAL FUNCTION DOCUMENT STOP FOR A CAPING DEVICE

[75] Inventor: Stefan A. Jasinski, Rochester, N.Y.

[73] Assignee: Xerox Corporation, Stamford, Conn.

[22] Filed: Sept. 26, 1972

[21] Appl. No.: 292,387

[52] U.S. Cl. .................................. 355/75, 271/60
[51] Int. Cl. ................................... G03b 27/62
[58] Field of Search ................. 355/11, 47, 75, 76; 271/50, 53, 60

[56] References Cited
UNITED STATES PATENTS

| | | | |
|---|---|---|---|
| 3,072,397 | 1/1963 | Kelchner | 271/60 X |
| 3,263,992 | 8/1966 | Schrempp | 271/60 X |
| 3,536,320 | 10/1970 | Derby | 271/60 X |

Primary Examiner—Fred L. Braun

[57] ABSTRACT

A document stop for locating or registering documents to be copied on the platen of a copying machine, the copying machine being capable of handling continuous length document materials such as computer fanfold as well. For this latter purpose, the copying machine is provided with a form feeder to advance fanfold type document material over the copying machine platen, and a two position cover for the platen, the latter to enable single and fanfold type documents to be accommodated. In this context, the document stop is displaceable to an out of the way position to enable the fanfold type document material to be fed unimpeded over the platen when that type of document is being copied. An end of run or fanfold break sensor is supported on the document stop and is brought into operative engagement with the fanfold type document material when the document stop is displaced, to the out of the way position, the sensor including a control switch to terminate copying in response to either a break in the fanfold or exhausting of the fanfold supply.

5 Claims, 6 Drawing Figures

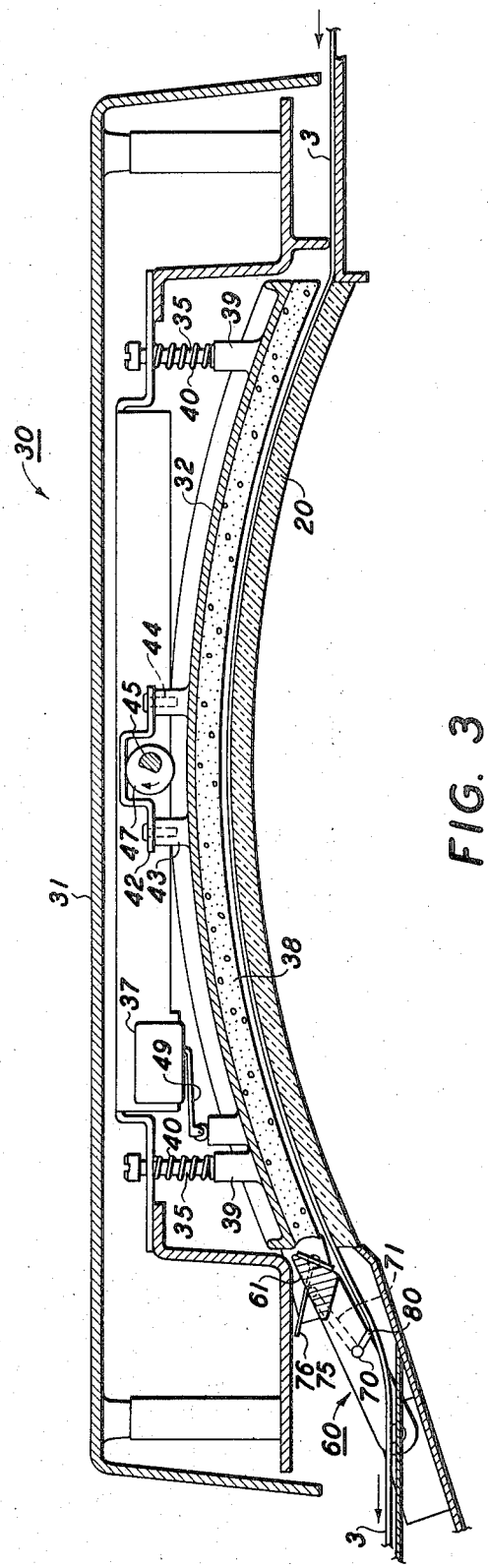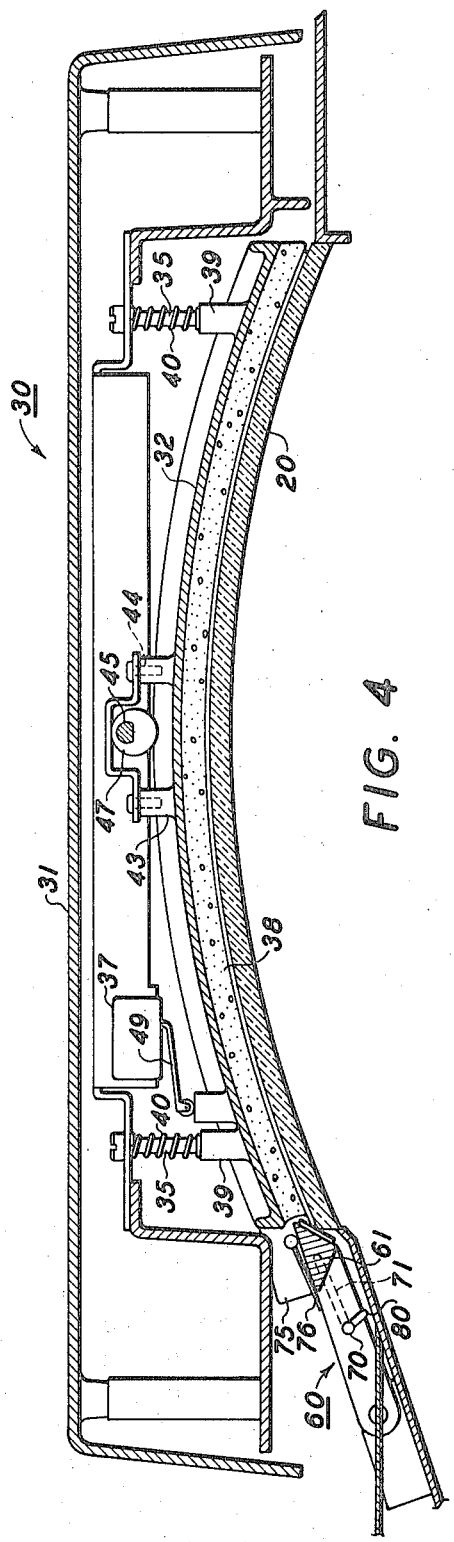
FIG. 3
FIG. 4

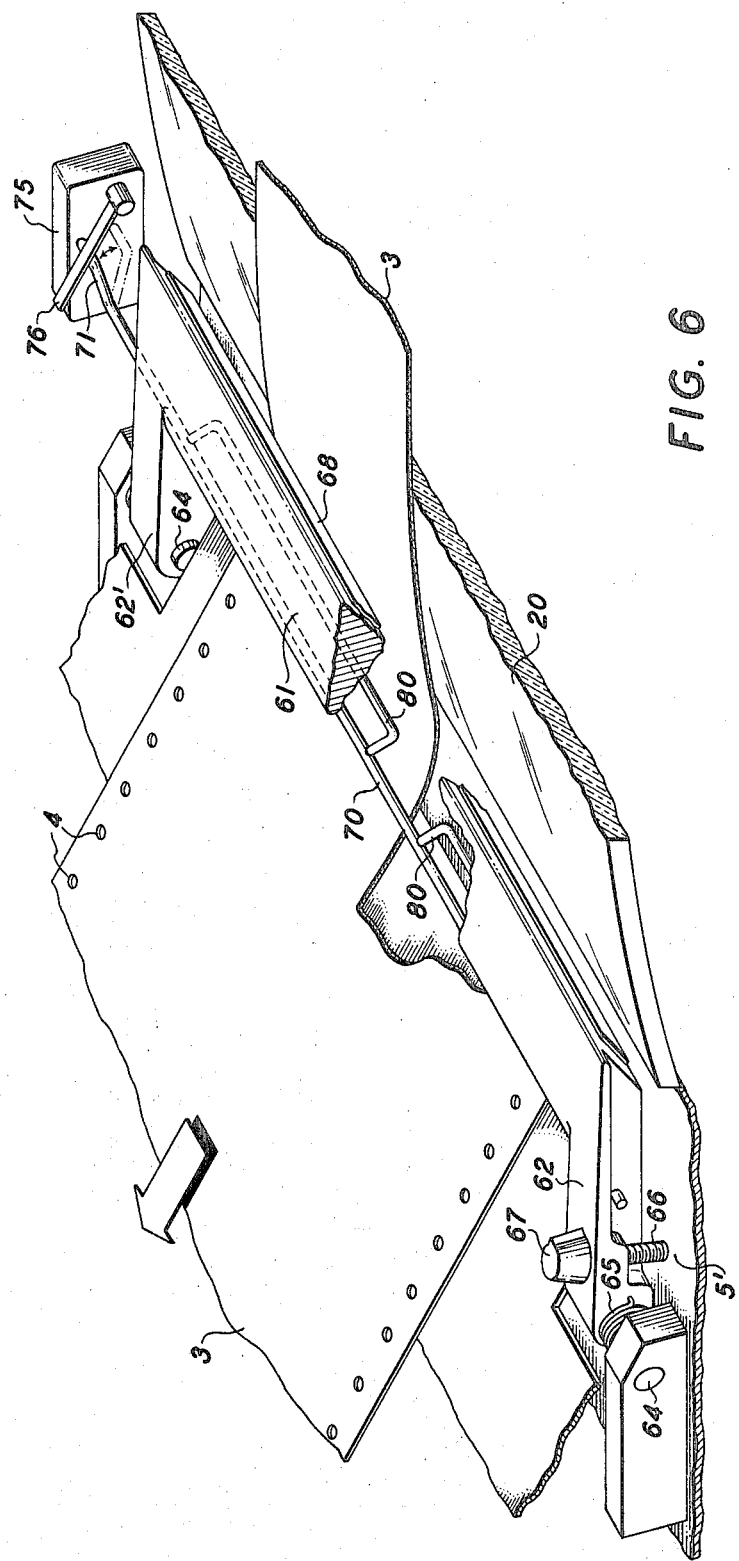

DUAL FUNCTION DOCUMENT STOP FOR A CAPING DEVICE

The invention relates to a document locating stop for copying machines, and more particularly, to an improved document locating stop enabling the copy machine to copy either individual documents or continuous length document material.

In copying machines, a stop is normally provided to assist the user in locating the document being copied in position on the copying platen. While the aforesaid stop may take several forms, one common type of document stop consists of a raised surface extending along and parallel to one edge of the platen. With this type of document stop, the user simply abuts the edge of the document against the upstanding edge of the stop to locate the document. In a copying machine also capable of handling continuous or web-type document material such as computer fanfold, the projection provided by this document stop could interfere with feeding of the web-type document material across the platen.

It is a principal object of the present invention to provide a new and improved document locating stop for copying machines.

It is an object of the present invention to provide an improved document register designed to aid the user in locating individual documents in copying position on the platen of the copying machine, to enable continuous form documents to be copied.

It is a further object of the present invention to provide a document locator for copying machines incorporating endless strip sensing means effective when the locator is moved aside to thereafter monitor the continuity of strip type document material.

It is an object of the present invention to provide an improved mechanism for sensing continuity of web-type originals in a copying machine effective on a break in the continuity of the web to terminate copying, the aforesaid mechanism incorporating in addition means to enable individual originals to be properly located in copying position whenever it is desired to copy single page originals.

This invention relates to a document copying machine adapted to handle either individual documents or document material in the form of an endless web; the copying machine including a platen on which the individual document or portion of the document web being copied rests during copying, the combination comprising, a document register stop adjacent one side of the platen for use in locating individual documents in place for copying on the platen, and means to move the stop to a position above the platen so as to permit the document web to pass thereunder when document webs are being copied.

Other objects and advantages will be apparent from the ensuing description and drawings in which:

FIG. 3 is a side view in section showing the platen cover retracted for copying web-type document material;

FIG. 4 is a side view in section showing the platen cover extended for copying individual documents;

FIG. 6 is an isometric view showing the document stop of the present invention raised to accommodate copying of web-type document material.

Figure 1:
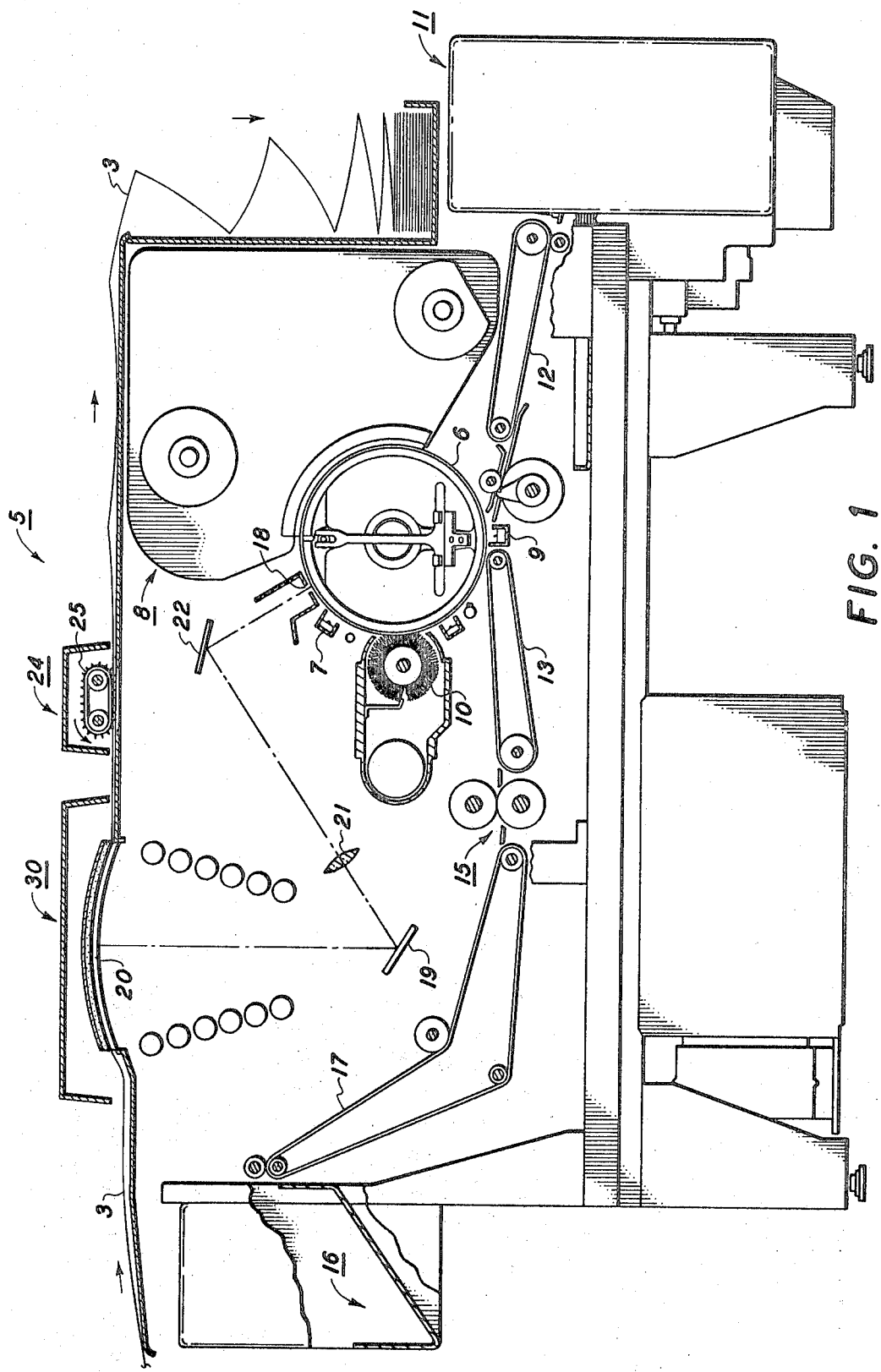
FIG. 1 is a schematic representation of a copying machine incorporating a dual function platen cover and the improved document stop of the present invention.

Referring to the drawings, there is shown in FIG. 1 an exemplary reproduction or copying machine 5 of a type suitable for use with the present invention. The copying machine 5 includes a rotating xerographic drum 6, a corona charging device 7, a xerographic developer 8, a transfer corotron 9, and a drum cleaning brush 10. Copy paper, supplied by paper feeder 11 and conveyor 12, operatively contacts the xerographic drum 6 opposite the transfer corotron 9 where transfer of the image takes place, conveyor 13 serving to carrying the image bearing paper to fuser 15 wherein the toner delimited image is permanently fixed. The fused copy is discharged into output tray 16 by conveyor 17.

The xerographic drum 6, following cleaning by brush 10, is charged by the corona charging device 7 prior to exposure to the image being copied at point 18. The image at point 18 originates from scanning by rotating mirror 19 the document resting on platen glass 20, the image reflected by mirror 19 passing through lens 21 and mirror 22 onto the surface of drum 6 at point 18.

The copying machine 5 is adapted to copy either single page documents 2 or continuous or web-type documents such as computer fanfold 3. To accommodate this latter type of document copying machine 5 includes, adjacent one side of platen glass 20, a form or web feeder 24 having a pair of endless sprocketed feed tractors 25 cooperable with edge perforations in fanfold 3 to draw the fanfold material across platen glass 20. Feed tractors 25 are intermittently driven to draw the computer fanfold across platen glass 20 in increments corresponding to a page, copying thereof being effected while drive to feeder sprockets is interrupted and the fanfold 3 stationary.

As seen in FIG. 1, the copying machine platen glass 20 is arcuate, single page documents 2 or the portion of fanfold 3 then being copied resting thereupon during the copying cycle. Other platen shapes, i.e., flat, may be readily envisioned.

Figure 2:
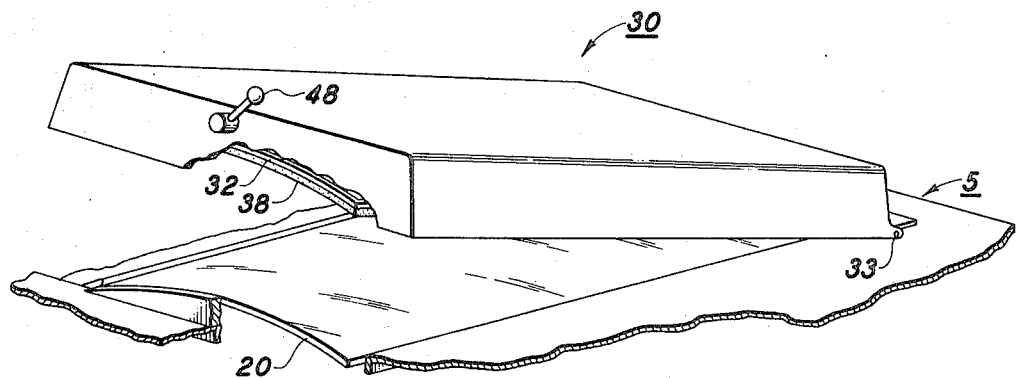
FIG. 2 is an isometric view of the platen cover shown by FIG. 1.

Referring particularly to FIGS. 2–4 of the drawings, the platen cover, which is designated generally by the numeral 30, is thereshown supported in operative position on copying machine 5 opposite platen glass 20. Cover 30 is hingedly attached to the frame portion (not shown) of copying machine 5 for raising or lowering movement off of or onto platen glass 20. Cover 30 serves to protect the platen glass 20 against damage when copying machine 5 is not in use and, during the copying cycle, to protect the user's eyes against extraneous light and retain individual documents 2 in proper copying position on platen glass 20 while copying thereof is being effected. The hinged attachment of cover 30 allows platen glass 20 to be readily accessed as when loading or unloading individual documents 2, or when threading web-type document material such as computer fanfold 3 to copying machine 5, or for other purposes such as clearing jams.

Platen cover 30 consists of relatively movable outer and inner cover parts 31, 32 respectively, the inner cover part 32 being housed within outer cover part 31 for movement between a raised computer fanfold copying position (shown in FIG. 3) and a lowered individual document copying position (shown in FIG. 4). Outer cover part 31 comprises an internally recessed part made from relatively light but rigid material such as plastic and of a size sufficient to cover the entire platen glass area as well as the adjoining side edge portions thereof including the document locating steop 60. The exterior surfaces of outer cover part 31 may have a suitable decorative finish. Outer cover part 31 is hingedly secured along the rear or inside edge thereof to the copying machine frame as by pin connections 33. As will be understood, this permits the entire cover 30 to be swung up when access to platen glass 20 is required.

Outer cover part 31 is provided with a plurality of internal depending support rods 35 disposed at strategic locations thereon. Rods 35 serve to slidably mount inner cover part 32 for limited raising and lowering movement thereon. A mode switch 37 is supported from outer cover part 31, mode switch 37 serving to provide a control signal reflecting the disposition of inner cover part 32.

Inner cover part 32 is formed from a relatively rigid piece such as plastic to a configuration and size generally corresponding to the shape and size of the platen glass 20. A relatively soft rubber-like material 38 is secured as by bonding to the lower surface of cover part 32 opposite platen glass 20, the rubber-like material serving to protect the glass as well as any documents 2 on platen glass 20 from damage. The rubber-like material is preferably a xerographic white to prevent side edge contrast marks.

Inner cover part 32 has a plurality of upstanding hollow supports 39 projecting therefrom disposed diametrically opposite to the downwardly projecting support rods 35 on outer cover part 31, rods 35 being slidably received in supports 39 to thereby mount inner cover part on outer cover part for movement relative thereto. Springs 40 are provided to bias inner cover part 32 downwardly toward the platen glass 20.

Brackets 42 are spacedly supported on bosses 43 on the upper surface of lower cover part 32 as by means of screws 44 adjacent the midportion thereof. A control shaft 45, rotatably journaled in the depending sides of outer cover part 31, extends between inner cover part 32 and brackets 42 to hold inner cover part 32 in assembled relationship with outer cover part 31. Cams 47 on control shaft 45 are disposed in the space between inner cover part 32 and brackets 42 such that turning of control shaft 45 and cams 47 thereon functions to move inner cover part 32 relative to the outer cover part 31 and raise or lower inner cover part 32. A suitable actuating knob 48 together with position indicator marks (not shown) are provided on the extended end of the control shaft 45 to facilitate turning movement thereof. Arm 49 of mode switch 37 is arranged to ride on the upper surface of inner cover part 32 such that movement of inner cover part 32 to a fully retracted position disposes switch 37 in one operating position while movement of inner cover part 32 to the fully extended position disposes switch 37 in a second operating position.

Where individual documents 2 are to be copied, knob 48 is grasped and control shaft 45 turned to displace inner cover part 32 downwardly away from the outer cover part 31 against the bias of springs 40. With the entire platen cover assembly moved to a raised position, the document 2 to be copied is placed face down on platen glass 20 and cover 30 closed. Closure of cover 30 initially brings the inner cover part 32 into overlying contact with the document resting on platen glass 20, the continued movement of cover 30 to a fully closed position causing an inner cover member 32 to collapse slightly into the outer cover member 31 against the bias of springs 40 thereby establishing a slight holding bias through inner cover part 32 on the document 3 therebelow. It is understood that a suitable lock (not shown) may be provided for retaining the cover 30 in the fully closed position. On completion of the copying cycle, cover 30 is raised and the document 2 removed. The process is repeated for each document to be copied.

It is to be understood that individual documents 2 as used herein includes not only single sheet documents, but also multi-page pamphlets, books, and the like.

The disposition of the inner cover part 32 in the single page document mode is reflected by switch 37, the ensuing signal from which may be used to visibly indicate to the user of copying machine 5 the particular mode of operation then being used as well as to enable operation of components of copying machine 5 as for example form feeder 24.

Where computer fanfold 3 is to be copied, knob 48 is grasped and control shaft 45 turned to a second position permitting springs 40 to retract the inner cover part 32. In this circumstance, with the cover assembly closed, the inner cover part 32 is held in spaced relation to platen glass 20 a slight distance above the surface of glass 20. This permits feeder 24 to move fanfold material 3 across the platen glass 20 unimpeded by cover 30, yet at the same time permits cover 30 to remain closed and platen glass 20 covered. It is understood that the proximity of the internal surface of inner cover part 32 to glass 20 also serves to prevent any tendency for the fanfold material 3 to bulge or buckle. In this disposition of inner cover part 32, mode switch 37 is actuated to a second position.

Figure 5:
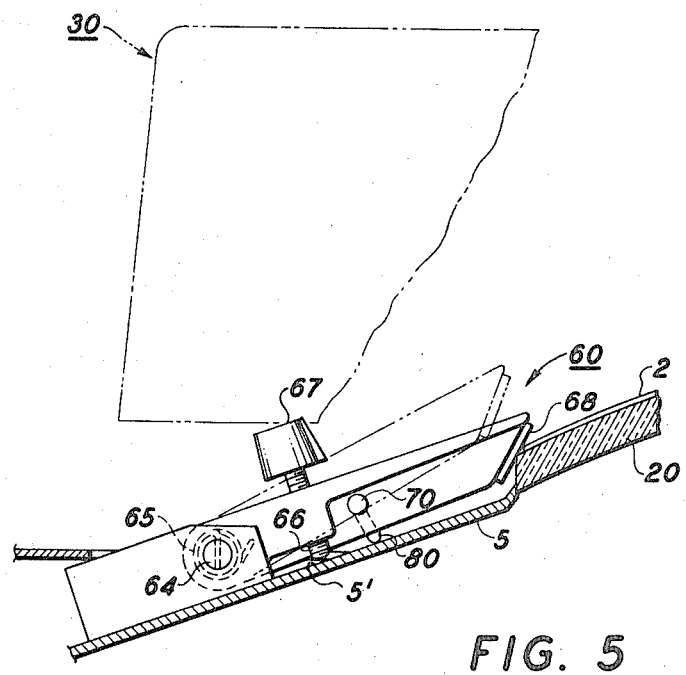
FIG. 5 is an enlarged side view in cross section showing the document stop of the present invention disposed in document registering mode.

Referring now particularly to FIGS. 5 and 6 of the drawings the details of the dual function document locating stop register 60 of the present invention is there shown. Stop 60 consists of a generally U-shaped member, the central segment 61 of which spans along one side of platen glass 20 to present a substantially straight locating stop for individual documents 2.

Stop 60 is pivotally mounted on copy machine 5 by means of pins 64, suitable torsion springs 65 being provided to bias stop 60 downward (in clockwise direction as seen in FIG. 5.) toward platen glass 20, contact of stop 60 with the platen glass 20 limiting downward movement thereof. A lift screw 66 threadedly received in one leg 62 if stop 60 is provided for abutment with base plate 5' of the copying machine frame. Screw 66 includes a suitable operating knob 67 thereon to facilitate turning of screw 66, it being understood that turning of screw 66 lowers or raises stop 60 to bring stop 60 into and out of operative position with respect to the platen glass 20 as will appear.

The locating edge 61 of stop 60 is beveled back slightly and white rubber piece 68 is secured thereto. Rubber 68 serves to avoid metal to glass contact between the edge of 61 and platen glass 20.

With screw 66 in the fully retracted position, stop 60 is disposed in position for locating individual documents 2 (in the solid line position shown in FIG. 5). Locating edge 61 thereof mates with the adjoining side of platen glass 20 and provides and upwardly projecting surface along which one edge of the document 2 can be abutted to locate the document 2 in proper position on the platen glass 20.

Stop 60 carries a transversely extending switch control rod 70 in depending legs 62, 62' thereof, one end 71 of rod 70 projecting through and beyond leg 62 into operative contact with arm 76 of control switch 75. Control switch 75 serves by means of suitable internal circuitry (not shown) to enable copying operation of the machine 5 and of form feeder 24. Other suitable circuitry (not shown) is provided to render control switch 75 inoperable when copying machine 5 is operated in the individual document copying mode.

Control rod 70 which is journaled for free rotation in legs 62, 62' of stop 60 carries a pair of depending U-shaped links 80 thereon. As will appear, links 80 rest or ride on the computer fanfold material moving thereunder during operation of copying machine 5 in the fanfold copying mode. Links 80 cover substantially the entire operating length of control rod 70 to thereby accommodate fanfold materials of various widths.

Where computer fanfold 3 is to be copied, screw 66 is extended (to the dotted line position of FIG. 5) to raise stop 60 above base 5' and platen glass 20 thereby permitting fanfold material to be moved thereunder by forms feeder 24. As stop 60 is raised, depending links 80, which are relatively heavy, tend to remain in the most nearly vertical position possible so that control rod 70 swings or pivots toward the vertical position (in clockwise direction seen in FIG. 5) as stop 60 lifts up. The aforesaid tendency of control rod 70 to assume a vertical position may be augmented by any bias inherent in arm 76, of control switch 75. And, as will be understood other bias may be provided for this purpose.

When computer fanfold 3 is to be copied, the fanfold material is threaded under the raised locating stop 60 across platen glass 20 and into driving engagement with forms feeder 24, the latter serving to incrementally advance the fanfold material 3 across the platen glass 20 during the copying cycle as explained heretofore. This position of the fanfold material under stop 60 and consequent engagement thereof with one or more of the projecting links 80 on control rod 70, turns the rod 70 (in counter-clockwise direction as seen in FIG. 5) against the gravity weight of the links 80 and any bias imposed by the arm 76 of control switch 75 to actuate switch 75 and enable operation of the copying machine 5 and forms feeder 24.

If during the copying cycle the fanfold material 3 should break, or the supply thereof run out, the loss of support for control rod 70 enables the control rod 70 to swing downwardly toward the vertical thereby releasing the control switch 75. Release of switch 75 terminates further copying by the copying machine 5, copying machine 5 entering a cycle out or end-of-run type shut down sequence wherein copies already in process within the machine 5 are completed as will be understood by those skilled in the art. At the same time, forms feeder 24 is stopped.

While the invention has been described with reference to the structure disclosed, it is not confined to the details set forth; but is intended to cover such modifications, or changes as may come within the scope of the following claims.

What is claimed is:

1. In a document copying machine adapted to handle either individual documents or document material in the form of an endless web, said copying machine including a platen on which said individual documents or the portion of said document web being copied rests during copying, the combination of:
   a document register stop adjacent one side of said platen for locating individual documents in place for copying on said platen,
   means supporting said stop for movement between a first position in which said stop is raised so as to permit said document web to pass thereunder unimpeded when copying said document web
   and a second position said which sais stop is lowered to permit said stop to function as a stationary register for individual documents during copying thereof; and
   operating means actuable to selectively place said stop in either of said first and second positions to permit copying of either said document web or individual documents.

2. In a document copying machine adapted to handle either individual documents or document material in the form of an endless web, said copying machine including a platen on which said individual documents or the portion of said document web being copied rests during copying, the combination of:
   a document register stop adjacent one side of said platen for locating individual documents in place for copying on said platen,
   means to raise said stop so as to permit said document web to pass thereunder unimpeded when copying said document web,
   control means responsive to a break in said document web to terminate copying by said copying machine, and
   means responding to raising of said stop to activate said control means.

3. In a copying machine adapted to copy either individual or continuous length documents, said copying machine including a platen on which a document or document portion being copies rests together with means for feeding continuous length documents to and from said platen during copying thereof, the combination of:
   a document locating member;
   means supporting said locating member for movement between operative and inoperative document locating positions, said locating member presenting an upstanding document stop surface adjoining one side of said platen when in said operative position for use in locating individual documents in position on said platen for copying;
   said locating member being adapted on movement to said inoperative position to provide a passage thereunder through which said continuous length documents may be fed unimpeded over said platen;
   a control switch for said copying machine adapted when actuated to terminate copying operation of said machine, and
   operating means for said control switch mounted on said locating member and effective on movement of said locating member to said inoperative position to thereafter monitor the continuity of the continuous length document being copied as said document passes thereunder, said operating means being adapted on a break in said continuous length document to actuate said control switch and terminate copying operation of said copying machine.

4. The copy machine according to claim 3 in which said operating means includes at least one sensing element depending from said locating member for engagement with the surface of said continuous length document as said document passes thereunder, said sensing element responding to a break in said continuous length document to actuate said control switch.

5. The copy machine according to claim 3 in which said operating means includes at least two sensing elements depending from said locating member for engagement with the surface of said continuous length document as said document passes thereunder, said sensing elements being arranged in predetermined spaced relationship whereby to accommodate continuous length documents of various widths and assure contact of at least one sensing element with the continuous length document being copied; each of said sensing elements being responsive on a break in the continuous length document to actuate said control switch.

* * * * *

UNITED STATES PATENT OFFICE
CERTIFICATE OF CORRECTION

Patent No. 3,804,514        Dated April 16, 1974

Inventor(s) Stefan A. Jasinski

It is certified that error appears in the above-identified patent and that said Letters Patent are hereby corrected as shown below:

In the Title, change "Caping" to --Copying--.

Signed and sealed this 29th day of October 1974.

(SEAL)
Attest:

McCOY M. GIBSON JR.        C. MARSHALL DANN
Attesting Officer          Commissioner of Patents